March 30, 1965 J. P. JONES, JR 3,175,777

TAPE TRANSPORT SYSTEM

Filed March 5, 1963

INVENTOR
JOHN PAUL JONES, JR.

BY Lawrence R. Brown

ATTORNEY 3,175,777

TAPE TRANSPORT SYSTEM

John Paul Jones, Jr., Wynnewood, Pa., assignor to Navigation Computer Corporation, a corporation of Pennsylvania Filed Mar. 5, 1963, Ser. No. 262,904
1 Claim. (Cl. 242—55.11)

This invention relates to tape transport systems and more particularly it relates to tape systems for transducing successive code groups on a step by step basis as the tape is quiescent.

In conventional tape transport systems either the tape is advanced in steps by a constantly running motor which is clutched intermittently or by a power ratchet drive used to yank the tape quickly from one quiescent state to another. The first type requires high power and complex drive means dependent upon wearable friction clutches and differential gearing in most instances. The latter type is difficult to use with inexpensive paper tape because of the need to quickly accelerate from one quiescent position to the next and thus tends to rupture sprocket drive holes in punch paper tape. Furthermore, power drive ratchet mechanisms are difficult to adjust, are sensitive to speed changes, and tend to wear so that they are not reliable in operation over long periods of time.

Accordingly it is an object of this invention to provide improved long wearing tape transport means for use with punched paper tape.

Another object of the invention is to provide efficient tape drive means using little power.

A further object of the invention is to provide a simplified tape transport system providing reliable operation.

A still further object of the invention is to provide a tape transport which has no standby power requirement.

In accordance with the invention therefore a simplified step by step tape drive mechanism is provided which advances the tape in precisely metered increments. The tape is kept under substantially constant tension at all times and therefore will not tear or break when advanced. This feature also provides for superior printing or punching performance by maintaining the tape taut at the recording area. The drive mechanism will require no standby power and uses an intermittently operable motor to afford operation with very little power consumption and with essentially no heat accumulation. Simplified construction with very few parts permits reliable operation with litle chance of failure caused by wearing of parts. Parts are not critical in tolerance or adjustment and yet the incremental tape advance may be held to very close dimensional stability. Basically the performance is achieved by use of an escapement mechanism to meter out tape in increments responsive to constant tape tension supplied by a spring loaded tension arm. Intermittently the spring tension is reloaded by the motor as the used tape is reeled onto a storage spool simultaneously.

Figure 1:
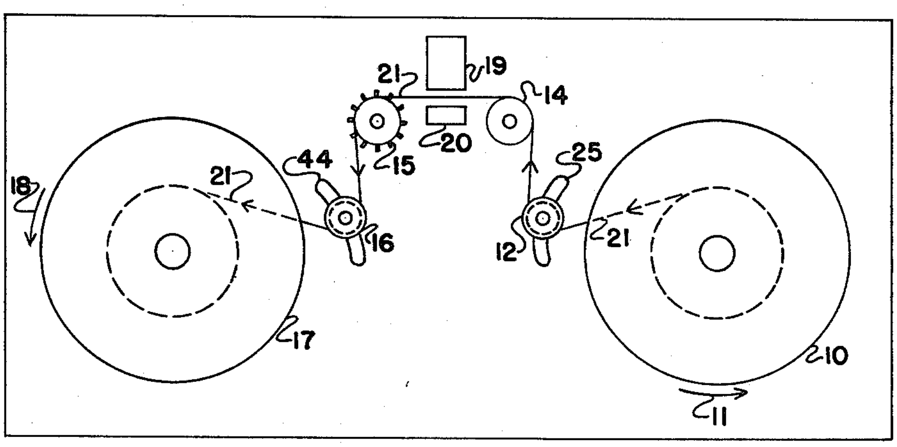
Figure 2:
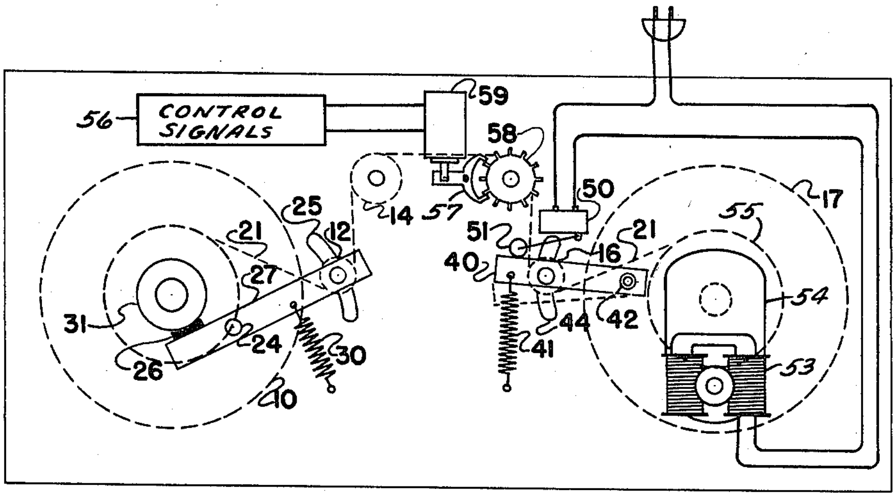

Further features and objects of the invention are found in the following specification which refers to the accompanying drawing, in which:

FIGURE 1 is a diagrammatic layout of the front panel of a tape transport embodying the invention, and FIGURE 2 in a sketch of the rear panel of the tape transport of FIGURE 1.

With reference to the front panel view of FIGURE 1, a tape storage spool 10 rotating counterclockwise as shown by arrow 11 dispenses tape about the dispensing pulley 12, the idler pulley 14, the feed pulley 15 having a sprocket drive, the takeup pulley 16 and onto the takeup spool 14, which also rotates in a counterclockwise direction as shown by arrow 18. The tape 21 is taut when pulled past the punching or printing heads 19 and anvil 20 to afford thereby reliable punching or printing performance without snags or smears.

In the rear view of FIGURE 2 the dispensing pulley 12 is shown guided in an arcuate path 25 about pivot point 24 to operate a braking shoe 26 on the dispensing tension arm 27. Spring 30 affords a braking action between shoe 26 and the drum surface 31 in rest position as shown. The spring 30 supplies a tension on the tape 21 as it is pulled around idler pulley 14 and rides upward in the arcuate slot 25. As the tape is pulled through the punch head 19 it pulls against spring 30 to pivot brake shoe 26 off the drum 31 and permits the tape to be dispensed until tension released enough to return the brake shoe 26 to drum 31. Thus small incremental feeding strokes may be used to release tape without the excessive wear or power requirements of rotating clutches and continuously operating motors. Wear on the brake shoe assembly is minimal since it operates at low surface speeds and the intermittent operation generates little heat.

The movable takeup pulley tension arm 40 is in essence an auxiliary tape drive mechanism serving to pull tape from the dispensing spool 10 by operation of spring tensioning means 41. The arm is pivoted about point 42 to let the takeup tension pulley 16 ride in its arcuate path 44 to maintain a substantially constant tension on tape 21 as it moves through a limited arc of movement defined by operation of the switch 50 through its actuation arm 51.

As the switch 50 is closed, the motor 53 will wind up tape on reel 17 by way of an intermediate gear train 54 which gives appropriate speed reduction and serves to impart a flywheel effect to hub 55 when the motor is operated on impulse closure of switch 50 to permit it to coast to a stop. Thus as the motor operates, the movable tension arm 40 changes position moving upward as the used tape on pulley 16 is rolled onto spool 17. In the upward position the switch 50 is opened and the motor stops. In motion between the two positions, the tension spring 41 applied to tape 21 remains substantially constant. The motor serves to reload the spring 41 by moving the tension arm 40 to its initial reference position, so that no standby power is required.

The tape 21 may be used in a plurality of incremental steps as measured out precisely under control of the escapement mechanism 58. Solenoid 59, operates the escapement arm 57 to release each increment of tape selectively upon response to electromagnetic action from electrical control signals in section 56. The loaded spring 41 thereby is auxiliary drive means serving to pull the tape from the dispensing reel 10. Essentially therefore the motor 53 serves only to reload the spring 41 and reel used tape on the takeup spool 17 and the tension of the tape is primarily afforded by the spring 41, which varies little during the slight movements of tension arm 40.

The efficient simple tape transport system is afforded in accordance with the invention by utilizing an escapement mechanism to meter out tape in carefully measured increments under controlled tension and operating the motor only in short bursts of power. Those features of the invention which define in particularity its features of novelty and its organization are found in the accompanying claim.

What is claimed is:

A tape transport for advancing tape in step by step increments comprising in combination a storage reel for dispensing tape, a takeup spool for receiving tape, a motor, a gear train coupling the motor to drive the takeup spool at appropriate speed, an energization circuit for the motor including an off-on switch, a set of pulleys for passing tape from said storage reel to said takeup spool, said set including a feed pulley, a takeup tension pulley and a dispensing tension pulley, a pivoted takeup tension arm mounted to move said takeup tension pulley through an arcuate path, tensioning means coupled with said takeup tension arm to tend to pull tape from said storage reel, mechanical coupling means for operating said switch responsive to movement of said takeup tension arm to thereby operate said motor intermittently as the position of the takeup tension arm changes, an escapement mechanism coupled to said feed pulley to produce step by step increments of tape feed, electromagnetic means for operating the escapement mechanism selectively for a single step advance of the tape, and a pivoted braking arm including tensioning means for holding the braking arm in braking contact with the storage reel, and being pivoted to permit the first said tensioning means for pulling the tape through the escapement mechanism and disengaging the braking contact momentarily, whereby the tape is transported in increments upon operation of the electromagnetic means, and the motor is only actuated momentarily and occasionally as the takeup tension arm produces used tape and causes the switch to wind up used tape on the takeup spool.

References Cited by the Examiner

UNITED STATES PATENTS

| | | | |
|---|---|---|---|
| 1,952,196 | 3/34 | Coil | 242—75.43 |
| 2,310,947 | 2/43 | Fischer | 242—55.14 |
| 2,318,316 | 5/43 | Lawrence | 242—75.3 X |
| 2,725,200 | 11/55 | Ward | 242—55.14 |
| 2,977,059 | 3/61 | Mero | 242—55.11 |
| 2,991,022 | 7/61 | Wallens | 242—75.51 |

MERVIN STEIN, *Primary Examiner.*